(12) United States Patent
Lesch, Jr. et al.

(10) Patent No.: US 7,757,722 B1
(45) Date of Patent: Jul. 20, 2010

(54) INSULATED PIPE CONCEALER

(76) Inventors: James A. Lesch, Jr., 27 Foxhill Rd., Branchville, NJ (US) 07826; Glen P. Metzler, 4 Dejazer Dr., Augusta, NJ (US) 07822

( * ) Notice: Subject to any disclaimer, the term of this patent is extended or adjusted under 35 U.S.C. 154(b) by 823 days.

(21) Appl. No.: 10/603,235

(22) Filed: Jun. 24, 2003

(51) Int. Cl.
*F16L 59/02* (2006.01)
*F16K 51/00* (2006.01)

(52) U.S. Cl. ........... 138/149; 138/156; 138/108; 138/110; 137/382; 137/375

(58) Field of Classification Search ........... 138/149, 138/110, 108, 106, 120, 155, 157–158, 162, 138/163, 166–169; 137/382, 375; 248/55; 174/72
See application file for complete search history.

(56) References Cited

U.S. PATENT DOCUMENTS

| | | | | |
|---|---|---|---|---|
| 273,687 A * | 3/1883 | Kelly | ........... | 138/149 |
| 913,482 A * | 2/1909 | Ette | ........... | 138/158 |
| 1,618,455 A * | 2/1927 | Lindsay | ........... | 138/147 |
| 2,160,009 A * | 5/1939 | Walker | ........... | 138/149 |
| 2,650,180 A * | 8/1953 | Walker | ........... | 137/375 |
| 3,058,860 A * | 10/1962 | Rutter | ........... | 138/147 |
| 3,556,158 A * | 1/1971 | Schneider | ........... | 138/149 |
| 3,559,694 A * | 2/1971 | Volberg | ........... | 138/147 |
| 3,818,949 A * | 6/1974 | Johnson | ........... | 138/158 |
| 3,929,166 A * | 12/1975 | Westerheid | ........... | 138/149 |
| 4,103,701 A * | 8/1978 | Jeng | ........... | 137/375 |
| 4,323,088 A * | 4/1982 | McClellan | ........... | 138/106 |
| 4,438,785 A * | 3/1984 | Morrison et al. | ........... | 138/103 |
| 4,449,554 A * | 5/1984 | Busse | ........... | 138/149 |
| 4,530,478 A * | 7/1985 | McClellan | ........... | 248/62 |
| 4,830,060 A * | 5/1989 | Botsolas | ........... | 138/149 |
| 5,193,574 A * | 3/1993 | Lopez | ........... | 137/382 |
| 5,348,044 A * | 9/1994 | Eugene et al. | ........... | 137/312 |
| 5,391,840 A * | 2/1995 | Hughes et al. | ........... | 174/68.3 |
| 5,927,111 A * | 7/1999 | Nachbauer | ........... | 70/161 |
| 5,941,287 A * | 8/1999 | Terito et al. | ........... | 138/149 |

* cited by examiner

*Primary Examiner*—Patrick Brinson

(57) ABSTRACT

An insulated pipe concealer is provided comprising an elongated plastic pipe sleeve with a left side and right side pivotally connected to each other and adapted to close. An elongated insulation element is found inside the pipe sleeve with a channel adapted to receive a pipe. Latches for fastening the two sides of the pipe sleeve together; and hinged flaps adapted for attachment to a wall are attached to the exterior of the pipe sleeve. This pipe concealer is particularly useful in covering refrigeration pipes found on building exteriors.

19 Claims, 2 Drawing Sheets

INSULATED PIPE CONCEALER

BACKGROUND OF THE INVENTION

1. Field of the Invention

The present invention relates to an insulated pipe concealer for use in connection with covering pipes. The insulated pipe concealer has particular utility in connection with covering refrigeration pipes running along the outside of a house.

2. Description of the Prior Art

Insulated pipe concealers are desirable to covering pipes that run along the exterior of a house. The pipe concealer covers one or more pipes, giving the house a more finished and preferred look. One use for the pipe concealer is to cover exterior wall-mounted refrigeration lines when retrofitting an older home with central air conditioning.

The use of pipe concealers or protectors is known in the prior art. For example, U.S. Pat. No. 5,099,889 to Ratzlaff discloses an external pipe protector that protects pipes against damage by encircling the pipe in a shock absorbing material. However, Ratzlaff's patent leaves a porous filamentary mat with open weave exposed and does not protect the pipes from temperature fluctuations and, for pipes associated with an air conditioning unit, does not increase the efficiency of the air conditioning system by insulating the pipes. Additionally, this patent does not provide for an external surface with a means of attaching the pipe protector to a wall or other surface, and does not provide an outer covering that will have an attractive appearance when attached to the exterior of a house.

U.S. Pat. No. 4,780,347 to Cohen discloses insulation for pipes that protects the pipes from the cold. The patent provides for an insulation system containing a pressure sensitive adhesive that can be applied in both very cold and very warm temperatures and secures insulation around a pipe. However, Cohen's patent does not provide for a casing for the insulated pipe or pipes that hides the pipes from view and has an attractive appearance in addition to insulating them, and does not provide for a means of attaching the insulation system to a wall or other surface.

Similarly, U.S. Pat. No. 5,727,599 to Fisher discloses an insulating sleeve for a pipe that protects the pipe from external temperatures, sound and abrasion. However, Fisher's patent does not provide any means for attaching the insulating sleeve to a wall or any other surface, and does not have an attractive appearance when attached to the exterior of a house.

U.S. Pat. No. 5,586,568 to Helmsderfer discloses a cover assembly for under-sink piping that insulates the pipes using insulated cover pieces and slid able collars. This cover insulates the pipes and protects a person from abrasions and bumps caused by contact with the piping. However, Helmsderfer's patent does not disclose a means for attaching the cover assembly to a wall or any other surface, and does not have an attractive appearance when attached to the exterior of a house.

Lastly, U.S. Pat. No. 5,123,453 to Robbins discloses a tubular pipe insulation that protects pipes from hot or cold temperatures having a slit for positioning the insulation over the pipe and an adhesive such that release paper is not required. However, Robbins' patent does not provide any means for attaching the insulating sleeve to a wall or any other surface, and does not have an attractive appearance when attached to the exterior of a house.

While the above-described devices fulfill their respective, particular objectives and requirements, the aforementioned patents do not describe an insulated pipe concealer that is designed for use on the exterior of a house or other building. The abovementioned patents make no provisions for securing the pipe concealer to a wall or other surface and do not provide devices designed for the easy covering and snap closure around a pipe. The patent makes no provision for aesthetics for the assembly disposed along a wall or other surface of a building.

Therefore, a need exists for a new and improved insulated pipe concealer that can be used for covering and insulating pipes disposed along a wall or other surface of a building. In this regard, the present invention substantially fulfills this need. In this respect, the insulated pipe concealer according to the present invention substantially departs from the conventional concepts and designs of the prior art, and in doing so provides an apparatus primarily developed for the purpose of covering and insulating pipes disposed along a wall or other surface of a building, wherein the covering can be secured to the wall and has a more attractive appearance than the exposed pipes or other pipe coverings known in the art.

SUMMARY OF THE INVENTION

In view of the foregoing disadvantages inherent in the known types of concealers or covers for pipes now present in the prior art, the present invention provides an improved insulated pipe concealer, and overcomes the above-mentioned disadvantages and drawbacks of the prior art. As such, the general purpose of the present invention, which will be described subsequently in greater detail, is to provide a new and improved insulated pipe concealer and method which has all the advantages of the prior art mentioned heretofore and many novel features. This results in an insulated pipe concealer that is not anticipated, rendered obvious, suggested, or even implied by the prior art, either alone or in any combination thereof.

To attain this, the present invention essentially comprises an insulated pipe concealer comprising: an elongated plastic pipe sleeve having an interior surface and an exterior surface, a left side, and a right side, wherein the left side and right side pivotally connected and adapted to close with the left side abutting the right side; an elongated insulation element on the interior of the pipe sleeve; a channel disposed along the length of the insulation element in the direction of elongation, the channel being adapted to receive a pipe; a plurality of latches attached to the exterior of the pipe sleeve, wherein the latches are adapted for fastening the left side to the right side; and a plurality of hinged flaps attached to the exterior of the pipe sleeve, wherein the flaps are adapted for attachment to a wall. In one embodiment, the pipe concealer is substantially rectangular, approximately 10 foot long, and approximately 2" by 3."

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved insulated pipe concealer that has all of the advantages of the prior art pipe concealers and none of the disadvantages. In one embodiment, the pipe concealer is used for hiding refrigeration lines for air conditioning lines installed in an existing house where the lines run from the attic to the outside of the house down the side of the house to the ground. In another embodiment, the pipe concealer is used for hiding lines used for heating systems.

It is another object of the present invention to provide a new and improved insulated pipe concealer that may be easily and efficiently manufactured and marketed.

An even further object of the present invention is to provide a new and improved insulated pipe concealer that has a low cost of manufacture with regard to both materials and labor, and which accordingly is then susceptible of low prices of sale to the consuming public, thereby making such insulated pipe concealer economically available to the buying public.

Still another object of the present invention is to provide a new insulated pipe concealer that provides in the apparatuses and methods of the prior art some of the advantages thereof, while simultaneously overcoming some of the disadvantages normally associated therewith.

Even still another object of the present invention is to provide a pipe concealer for concealing pipes but not providing insulation. This allows for an inexpensive cover when insulation is not required.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

The current invention provides a device for covering exterior wall-mounted refrigeration lines when retrofitting an older home with central air conditioning. This pipe concealer is light-weight and has a simple design that is easy to install, has an attractive appearance, good insulation value, and provides protection for air conditioning lines and other pipes running along a wall or other structure. The pipe concealer can be installed in a relatively short period of time over a pair of refrigeration lines. Once in place, its smooth, straight lines provide a far more attractive look than a pair of exposed refrigeration lines. The pipe concealer will also protect the pipes from physical damage due to weather and accidental stresses such as that of a person bumping into the pipe.

Figure 1:
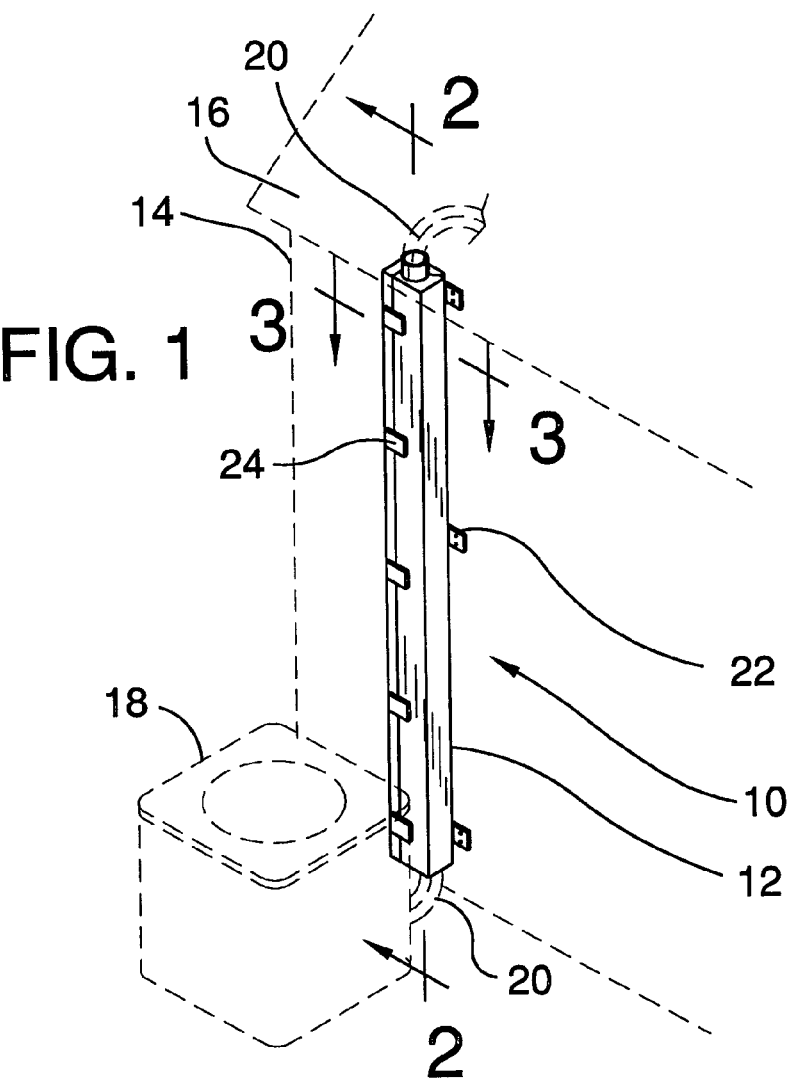
FIG. 1 is a perspective view of the preferred embodiment of the insulated pipe concealer comprising pipe and attached to a house constructed in accordance with the principles of the present invention.
Figure 3:
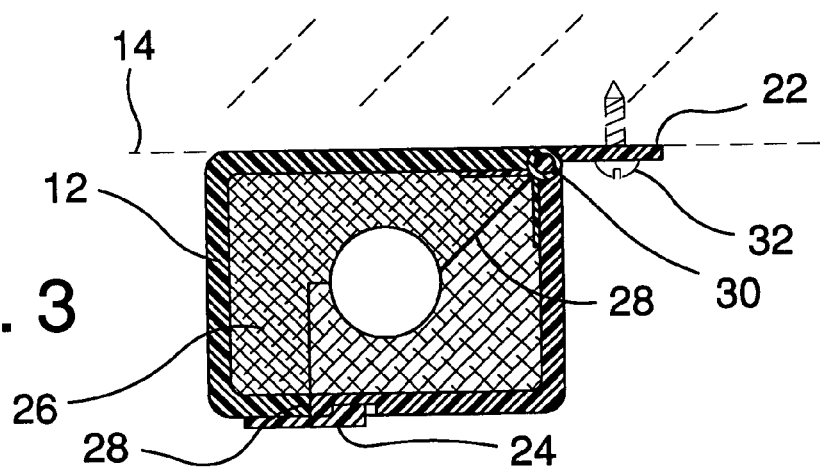
FIG. 3 is a horizontal cut-away view of the insulated pipe concealer of the present invention closed around a pipe and attached to a wall.
Figure 2:
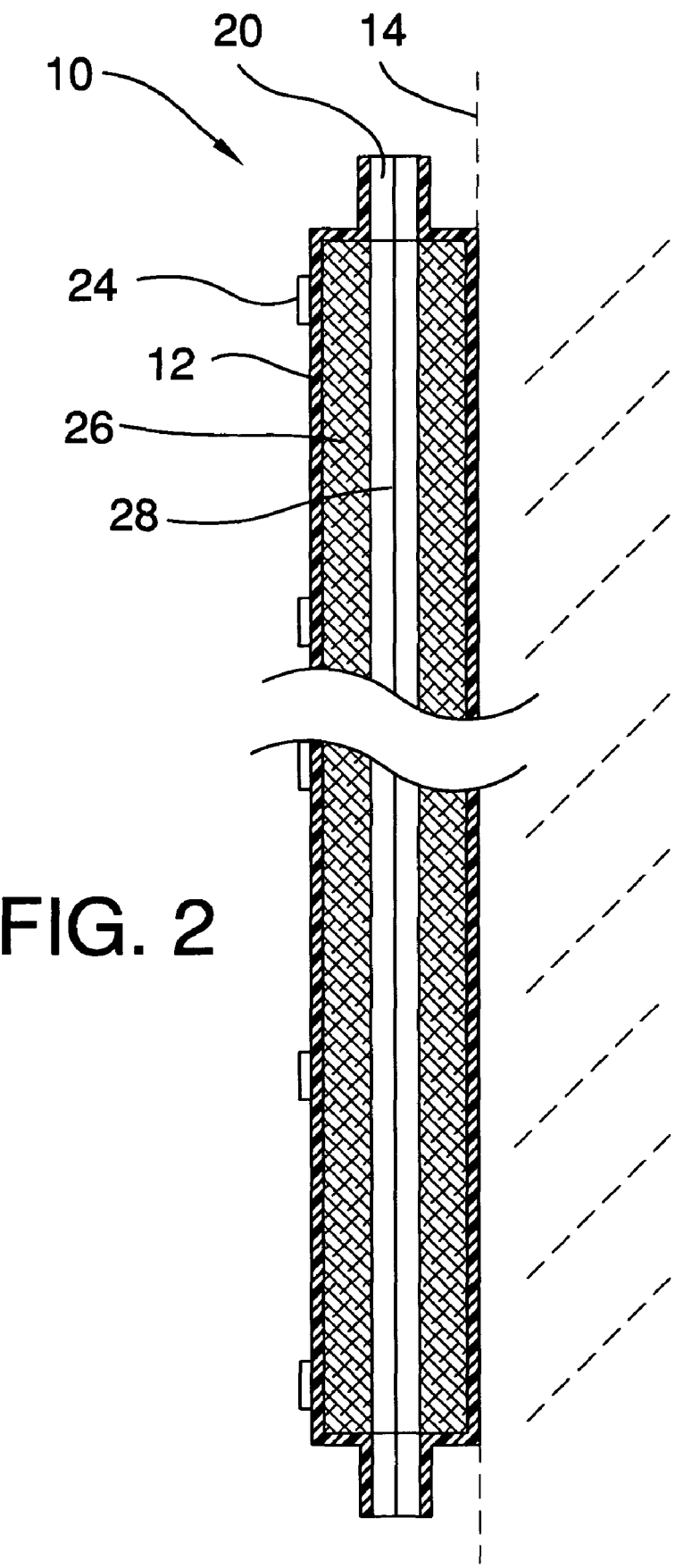
FIG. 2 is a vertical cut-away view of the insulated pipe concealer of the present invention closed around a pipe and attached to a wall.

Referring now to the drawings, and particularly to FIGS. 1-3, a preferred embodiment of the pipe concealer of the present invention is shown and generally designated by the reference numeral 10.

In FIG. 1, a new and improved pipe concealer 10 of the present invention for concealing and protecting pipes is illustrated and will be described. More particularly, the insulated pipe concealer 10 has a plastic sleeve 12, which runs, along the side of a house 14 from the attic 16 to the air conditioning unit 18 when installed. One or more pipes 20 will run though the plastic sleeve 12 into the attic 16 and into the air conditioning unit 18. The pipe concealer 10 is attached to the side of a house by a plurality of flaps 22 extending from the plastic sleeve 12 having nail holes, screw holes or other means of attachment for facilitating nailing or screwing the pipe concealer to a house.

The plastic sleeve 12 is comprised of two portions, which are opened to accept the pipes. One edge of the plastic sleeve is linked via a series of hinges. The other edge of the plastic sleeve 12, which is facing away from the wall when installed, contains a plurality of latches 24 which are preferably snap-fit latches. The latches 24 will snap together and hold the plastic sleeve 12 closed around a pipe 20.

FIG. 2 provides a cutaway view running vertically through the pipe concealer at a location illustrated by the number "2"s and arrows in FIG. 1. The plastic sleeve 12 surrounds insulation 26, which surrounds one or more pipes 20. The line running through the center of the pipe area 20 indicates a cut 28 in the plastic sleeve 12 used to open the pipe concealer 10 wide enough to place around one or more pipes 20. Latches 24 are shown at intervals along the outside of the plastic sleeve 12 for holding the pipe concealer 10 closed after installation. There must be enough latches 24 to securely close the pipe concealer 10. For example, there may be one latch every foot along the length of the pipe concealer, or one latch every two feet or every three feet along the length of the pipe concealer.

The insulation 26 is used to reduce the temperature change of the gas or fluids within the pipes due to the ambient temperature. This can substantially increases the efficiency of the air conditioning unit. Preferably, the insulation is a foam insulation, which can be produced and formed by methods known in the art. Alternatively, fiberglass insulation or other mineral fiber insulation material may be used. The insulation is attached to the interior surface of the plastic sleeve and is comprised of two portions, which may be opened to accept the pipes. The inner edge of the insulation may be formed to fit the one or more pipes by having one or more semi-circular cut of ¾", 1", 1¼", 1½, or any other diameter appropriate for surrounding pipes.

FIG. 3 provides a cutaway view running horizontally through the pipe concealer at a location illustrated by the number "3"s and arrows in FIG. 1. The rectangle-shaped plastic sleeve 12 surrounds insulation 26, which is adapted to surround one or more pipes 20. The flap 22 is attached to the plastic sleeve 12 by a three-way hinge 30, which is opened to lie flat against the side of a house 14. One or more screws 32 or other fasteners are driven through the flap 22 to attach the pipe concealer 10 to the house.

The cut 28 can be seen going from the hinge 30, through the insulation 26 and through the plastic sleeve 12 and divides the sleeve into a left and a right half. The cut 28 runs the entire length of the pipe concealer 10 and allows it to be opened to receive one or more pipes. When closed, the latch 24 snaps over the cut 28 and secures the pipe concealer 10 around the pipe 20.

The latch shown here is conveniently snaps one side of the plastic sleeve onto the other. Alternatively, the latch 24 may be any other connector that is used to attach one edge of the plastic sleeve to the other edge. The latch may be comprised of the same material as the plastic sleeve, or may be a different plastic or metal.

The plastic sleeve is preferably rectangular with dimensions of approximately 2" deep by 3" wide. Alternatively, a wider sleeve may be used, especially if a number of pipes are to be enclosed in one pipe concealer. For example, the sleeve may be 2" deep by 4-6" wide. The plastic sleeve may have relatively sharp corners as shown in FIG. 3, or the edges may be substantially rounded. Alternatively, the plastic sleeve may form a semi-circular shape, with the flat edge placed against the wall.

The pipe concealer preferably runs from where the pipes enter the attic to the air conditioning unit or turn to reach the air conditioning unit. For most applications, this requires a length of approximately 10 feet. In other applications, such as for homes with 10 or 12 foot ceilings, two story homes, or businesses, longer or shorter pipes will be appropriate. Alternatively, two or more pipe concealer segments may be attached to the pipes, with the bottom edge of one pipe concealer abutting the top edge of the second pipe concealer. Optionally, a latch is used to secure the two pipe concealers together. As both segments are attached to the wall, the slit between the two segments will be minimal. This segmented embodiment is useful for longer expanses of pipes and for facilitating manufacture and transportation of the pipe concealer.

In use, it can now be understood that the pipe concealer of the current invention can be closed around one or more pipes and snapped closed. The pipe concealer is secured to the wall using the flaps and screws, nails, or any other fastening means. The pipe concealer may be secured to the wall either before or after the pipes is enclosed inside the device.

The pipe concealer may be used to hide refrigeration lines for air conditioning lines installed in an existing house where the lines run from the attic to the outside of the house down the side of the house to the ground.

After the refrigeration lines are installed, this piece can be snapped over the lines and secured to the house. It also may be used to hide lines used for heating systems.

In one embodiment, the pipe concealer has no insulation. This is preferable when it is not required for hot and/or cold fluid to go through the pipe. The insulation-less pipe can be manufactured cheaply and insulation is not required without a temperature sensitive device. When no insulation is used, it is preferred that the pipe sleeve is smaller to accommodate the pipes with no insulation present.

The pipe concealer can be produced easily using conventional methods and readily available material. The outer casing of the pipe concealer can be produced by injection-molded or extruded polyvinylchloride or another suitable plastic. It can be sprayed on its interior with expanding foam-type insulation. Hinges and latches can be fabricated of a combination of sheet aluminum stamping and wire, sections of injection-molded plastic, etc. These methods of production are exemplary only, and should not be seen as limiting.

The insulation may be foam, or it may comprise one or more of: foam, fiberglass, paper, a metallized layer, etc. The insulation may be applied to the pipe by any known method, such as by cutting a foam to fit the pipe, a molding process, or the dipping process described in U.S. Pat. No. 5,586,568, herein incorporated by reference.

The pipe may be any conventional hot water pipe, cold water pipe, steam pipe, or pipe for carrying chemicals or petroleum products into a building. The pipe may be formed from any conventional material such as copper, steel, plastic, aluminum, or rubber. The pipe concealer is designed to cover one or more pipes which are attached or in close proximity to the outside wall of a building. However, other configurations would also be appropriate for use, including covering pipes running across the ceiling or the floor. The pipe concealer may also be used to conceal wiring and cables running near a wall.

While a preferred embodiment of the insulated pipe concealer has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable shape or external modifications may be made to the pipe sleeve to help it blend into the house to which it is attached. The plastic may be covered with another material, otherwise colored, or modified to alter its aesthetic appearance. Similarly, any suitable material may be used for the outer sleeve, such as metal or a variety of weather-treated woods may be used instead of the plastic described. In addition, although an insulated pipe concealer has been described, it should be appreciated that the insulated pipe concealer herein described is also suitable for concealing wires, cables, and other objects that tend to clutter up the outside of a building.

As used herein, the terms "approximately" and "about" means within 25% of the stated value, or more preferentially within 15% of the value. As used herein, "a" or "an" may mean one or more. As used herein in the claim(s), when used in conjunction with the word "comprising", the words "a" or "an" may mean one or more than one. As used herein "another" may mean at least a second or more.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An insulated pipe concealer comprising:
   an elongated plastic pipe sleeve having an interior surface and an exterior surface, a left side, a right side, and opposing open ends, wherein said left side and right side are pivotally connected and said pipe sleeve is adapted to close with said left side abutting said right side;
   an elongated insulation element on the interior of said pipe sleeve;
   a channel disposed along the length of said insulation element in the direction of elongation, said channel being adapted to receive a pipe, wherein said channel has opposing open ends such that said pipe protrudes from said opposing open ends of said channel and said opposing open ends of said pipe sleeve;
   a plurality of latches attached to the exterior of said pipe sleeve, wherein said latches are adapted for fastening said left side to said right side; and
   a plurality of hinged flaps attached to the exterior of said pipe sleeve, wherein said flaps are adapted for attachment to a wall.

2. The insulated pipe concealer of claim 1, wherein said pipe sleeve is substantially rectangular.

3. The insulated pipe concealer of claim 2, wherein said pipe sleeve is approximately 10 feet long.

4. The insulated pipe concealer of claim 3, wherein said pipe sleeve is approximately 2" deep and 3" wide.

5. The insulated pipe concealer of claim 4, wherein said channel is adapted to receive refrigeration pipes.

6. The insulated pipe concealer of claim 3, wherein said pipe sleeve is approximately 2" deep and 4-6" wide.

7. The insulated pipe concealer of claim 1, wherein said latch is a snap-latch.

8. The insulated pipe concealer of claim 1, wherein the exterior of said pipe sleeve is colored.

9. The insulated pipe concealer of claim 1, wherein the exterior of said pipe sleeve is textured.

10. The insulated pipe concealer of claim 1, wherein said pipe sleeve is polyvinylchloride.

11. The insulated pipe concealer of claim 1, wherein said insulation is a foam insulation.

12. The insulated pipe concealer of claim 1, wherein said hinged flap is adapted to attach to the outside wall of a house.

13. The insulated pipe concealer of claim 1, wherein said channel is adapted to receive two pipes.

14. The insulated pipe concealer of claim 1, wherein said channel is adapted to receive three or more pipes.

15. An insulated pipe concealer comprising:
    an elongated plastic pipe sleeve having an interior surface and an exterior surface wherein said exterior surface is substantially rectangular, a left side, and a right side, wherein said left side and right side are pivotally connected and said pipe sleeve is adapted to close with said left side abutting said right side, and opposing open ends;
    an elongated foam insulation element on the interior of said pipe sleeve;
    a channel disposed along the length of said insulation element in the direction of elongation, said channel being adapted to receive a pipe, wherein said channel has opposing open ends such that said pipe protrudes from said opposing open ends of said channel and said opposing open ends of said pipe sleeve;
    a plurality of latches attached to the exterior of said pipe sleeve, wherein said latches are adapted for fastening said left side to said right side; and
    a plurality of hinged flaps attached to the exterior of said pipe sleeve, wherein said flaps are adapted for attachment to a wall.

16. A pipe concealer comprising:
    an elongated plastic pipe sleeve having an interior surface and an exterior surface, a left side, a right side, and opposing open ends, wherein said left side and right side are pivotally connected and said pipe sleeve is adapted to close with said left side abutting said right side;
    a channel disposed along the length of said plastic pipe in the direction of elongation, said channel being adapted to receive a pipe, wherein said channel has opposing open ends such that said pipe protrudes from said opposing open ends of said channel and said opposing open ends of said pipe sleeve;
    a plurality of latches attached to the exterior of said pipe sleeve, wherein said latches are adapted for fastening said left side to said right side; and
    a plurality of hinged flaps attached to the exterior of said pipe sleeve, wherein said flaps are adapted for attachment to a wall.

17. The insulated pipe concealer of claim 1, wherein said pipe sleeve is substantially rectangular.

18. The insulated pipe concealer of claim 2, wherein said pipe sleeve is approximately 10 feet long.

19. The insulated pipe concealer of claim 3, wherein said pipe sleeve is approximately 2" deep and 3" wide.

* * * * *